(12) United States Patent
Gogotsi et al.

(10) Patent No.: US 8,778,105 B1
(45) Date of Patent: Jul. 15, 2014

(54) CARBON NANOTUBES CONTAINING CONFINED COPPER AZIDE

(71) Applicants: Yury Gogotsi, Ivyland, PA (US);
Valarie Pelletier, Troy, NY (US);
Farhad Forohar, LaPlata, MD (US);
Magdy Bichay, Springfield, VA (US)

(72) Inventors: Yury Gogotsi, Ivyland, PA (US);
Valarie Pelletier, Troy, NY (US);
Farhad Forohar, LaPlata, MD (US);
Magdy Bichay, Springfield, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1 day.

(21) Appl. No.: 13/998,023

(22) Filed: Aug. 28, 2013

Related U.S. Application Data

(62) Division of application No. 13/182,983, filed on Jul. 14, 2011, now abandoned.

(51) Int. Cl.
*C06B 45/00* (2006.01)
*C06B 45/04* (2006.01)
*C06B 35/00* (2006.01)
*D03D 23/00* (2006.01)
*D03D 43/00* (2006.01)

(52) U.S. Cl.
USPC .............. 149/109.6; 149/2; 149/17; 149/35; 149/108.2; 149/108.8

(58) Field of Classification Search
USPC .............. 149/2, 17, 35, 108.2, 108.8, 109.6
See application file for complete search history.

(56) References Cited

U.S. PATENT DOCUMENTS

| | | | |
|---|---|---|---|
| 6,746,971 B1 * | 6/2004 | Ngo et al. ..................... 438/780 |
| 7,833,366 B1 * | 11/2010 | Forohar et al. ............. 149/109.6 |
| 7,879,166 B1 * | 2/2011 | Forohar et al. .................. 149/35 |
| 2008/0153691 A1 * | 6/2008 | Jung et al. ..................... 502/240 |
| 2012/0060984 A1 * | 3/2012 | Gogotsi et al. .................. 149/35 |

* cited by examiner

*Primary Examiner* — James McDonough
(74) *Attorney, Agent, or Firm* — Fredric Zimmerman

(57) ABSTRACT

The invention concerns copper azide containing carbon nanotubes. The invention also concerns methods of producing such nanotubes by placing CuO nanoparticles within carbon nanotubes to produce CuO-containing carbon nanotubes, contacting CuO-containing carbon nanotubes with hydrogen to produce reduced nanotubes; and contacting the reduced nanotubes with hydrazoic acid to produce copper azide containing carbon nanotubes.

3 Claims, 6 Drawing Sheets

CARBON NANOTUBES CONTAINING CONFINED COPPER AZIDE

CROSS-REFERENCE TO RELATED APPLICATIONS

The present Application is a Divisional Application of U.S. patent application Ser. No. 13/182,983 filed on Jul. 14, 2011, which claims benefit of U.S. Provisional Patent Application No. 61/365,169, filed Jul. 16, 2010, the disclosure of which is hereby incorporated by reference herein in its entirety.

ORIGIN OF THE INVENTION

The invention described herein was made in performance of official duties by an employee of the Department of the Navy and may be manufactured, used, licensed by or for the United States Government for any governmental purpose without payment of any royalties thereon.

TECHNICAL FIELD

This invention concerns compositions comprising copper azide within carbon nanotubes and methods of making same.

BACKGROUND

The currently used primary explosives, such as lead azide and lead styphnate, present serious health hazards due to the toxicity of lead. There is a need to replace them with equally energetic but safer-to-handle and more environmentally friendly materials. Copper azide is more environmentally acceptable, but very sensitive and detonates easily from electrostatic charges during handling.

SUMMARY

In some aspects, the invention concerns methods for encapsulating copper azide inside AAO-templated carbon nanotubes. This has resulted in making an explosive device more than 100 times smaller in size than human hair. Initiation of azide inside the nanotubes did not lead to tube wall fracture. The detonation wave apparently propagated along the nanotube channel, providing an opportunity for directing the decomposition gas flow and possibly more efficient initiation of the secondary explosives. Hollow Cu/Cu—O containing nanoparticles were produced as a result of the encapsulated copper azide nanoparticle initiation. This experimental technique can be used to encapsulate a wide variety of energetic materials inside carbon nanotubes. A greener approach toward energetic nanomaterials has a potential to eliminate lead from primary explosives.

Compared to the current primary explosive materials, such as lead azide and lead styphnate, which are highly sensitive and present serious health hazards due to the toxicity of lead, this novel energetic composite material is safer to handle, uses environmentally friendly materials and processes, and is less sensitive to electrostatic charges, making it less likely to accidentally detonate. By containing the nanoenergetic material inside the CNTs, energetic properties are preserved while increasing safety of handling. Containment also increases stability, minimizing friction and static electricity effects, improving environmental and thermal stability. Using nanoenergetic materials increases the energy release due to the high aspect ratio of the copper azide nanoparticles.

In some embodiments, the invention concerns compositions comprising carbon nanotubes and, residing within (such as, encapsulated within) at least a majority of said nanotubes, copper azide. In certain embodiments, the carbon nanotubes have internal diameters of 100-300 nm. The invention also concerns explosives comprising compositions disclosed herein.

In other embodiments, the invention concerns methods of forming nanotube structures comprising: placing CuO nanoparticles within carbon nanotubes to produce packed nanotubes; contacting the packed nanotubes with hydrogen to produce reduced packed nanotubes (which can comprise a significant amount of elemental copper, any unreacted residual copper oxide can potentially convert to copper (II) azide); and contacting the reduced packed nanotubes with hydrazoic acid to produce copper azide containing carbon nanotubes. Copper azide can comprise copper (I) azide and/or copper (II) azide. In some embodiments, the hydrazoic acid is produced in gaseous form by heating a mixture of sodium azide with excess stearic acid at a temperature of at least 80° C.

Other embodiments concern methods of forming nanotube structures comprising: forming carbon nanotube by chemical vapor deposition of ethylene on an aluminum oxide substrate; placing CuO nanoparticles within the carbon nanotubes to produce packed nanotubes; contacting said packed nanotubes with sodium hydroxide to dissolve the aluminum oxide to produce released nanotubes; contacting the released carbon nanotubes with hydrogen to produce reduced packed nanotubes; and contacting the reduced packed nanotubes with hydrazoic acid to produce copper azide containing carbon nanotubes.

DETAILED DESCRIPTION OF ILLUSTRATIVE EMBODIMENTS

Figure 1:
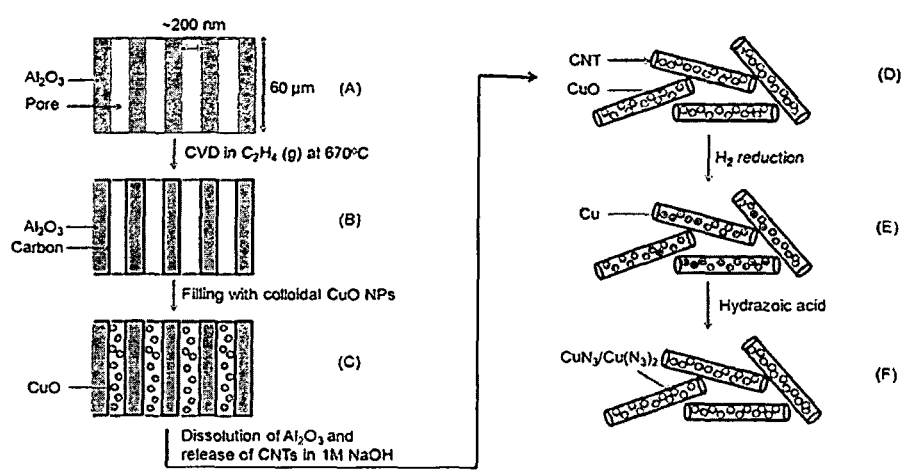
FIG. 1 presents schematics of the chronological steps of the synthesis process: (A) Commercial alumina membrane; (B) Carbon coated alumina membrane; (C) Pores of the carbon coated membrane filled with colloidal Cu—O nanoparticle (NP) solution; (D) Cu—O NP filled CNTs after dissolution of the alumina membrane; (E) Cu NP filled CNTs after $H_2$ reduction; (F) Copper azide NPs inside the CNTs.

The currently used primary explosives, such as lead azide and lead styphnate, present serious health hazards due to the toxicity of lead. There is a need to replace them with equally energetic but safer-to-handle and more environmentally friendly materials. Copper azide is more environmentally acceptable, but very sensitive and detonates easily from electrostatic charges during handling. We hypothesize that if the highly sensitive copper azide is encapsulated within conducting containers, such as AAO-templated carbon nanotubes (CNTs), its sensitivity can be tamed. This work describes a technique for confining energetic copper azide within CNTs. ~5 nm colloidal copper oxide nanoparticles are synthesized and filled into the 200 nm diameter CNTs, produced by template synthesis. The Cu—O inside the CNTs is reduced in hydrogen to copper (a significant amount is reduced to elemental copper), and reacted with hydrazoic acid gas to produce copper azide. Upon initiation, the 60 μm long straight, open-ended CNTs guide decomposition gases along the tube channel without fracturing the nanotube walls. These novel materials have potential for applications as nano-detonators and green primary explosives; they also offer new opportunities for understanding the physics of detonation at the nanoscale.

Current solid energetic materials used for primary explosives include lead and mercury azides (W. Zhu, H. Xiao, J. Phys. Chem. B 2006, 110, 18196), strong oxidizers, and compounds with a high nitrogen content (a) D. M. Badgujar, M. B. Talawar, S. N. Asthana, P. P. Mahulikar, J. Hazard. Mater. 2008, 151, 289; b) M. H. V. Huynh, M. A. Hiskey, T. J. Meyer, M. Wetzler, Proc. Natl. Acad. Sci. USA 2006, 103, 5409; c) M. H. V. Huynh, M. D. Coburn, T. J. Meyer, M. Wetzler, Proc. Natl. Acad. Sci. USA 2006, 103, 103222). Since they are toxic, pollute the environment, and have an inherent lack of stability, there is a need for safer and more environmentally benign energetic materials (M. H. V. Huynh, M. A. Hiskey, T. J. Meyer, M. Wetzler, Proc. Natl. Acad. Sci. USA 2006, 103, 5409 and M. B. Talawar, R. Sivabalan, T. Mukundan, H. Muthurajan, A. K. Sikder, B. R. Gandhe, A. S. Rao, J. Hazard. Mater. 2009, 161, 589). However, developing a suitable replacement for lead azide has been particularly challenging (M. H. V. Huynh, M. A. Hiskey, T. J. Meyer, M. Wetzler, Proc. Natl. Acad. Sci. USA 2006, 103, 5409).

A novel energetic material must exhibit the following properties to be a viable replacement: less toxic, more environmentally friendly, as energetic as current primary explosives (D. M. Badgujar, M. B. Talawar, S. N. Asthana, P. P. Mahulikar, J. Hazard. Mater. 2008, 151, 289), and safer to handle. Copper azide is a highly sensitive energetic material, even more than lead azide or lead styphnate (M. Cartwright, J. Wilkinson, in Correlation of Structure and Sensitivity in Azides; Cranfield Defence and Security, 2008 and B. L. Evans, A. D. Yoffe, P. Gray, Chem. Rev. 1959, 59, 515). Copper is less toxic than lead which reduces the risk to human health and the environment. For these reasons, copper azide is potentially a suitable replacement for the currently used toxic primary explosives. However, due to extreme electrostatic sensitivity copper azide does not have many practical applications. The present work is focused on encapsulating copper azide inside the channels of carbon nanotubes to reduce its electrostatic sensitivity.

CNTs filled with a wide array of materials including liquids (D. Mattia, Y. Gogotsi, Microfluid. Nanofluid. 2008, 5, 289 and Y. Gogotsi, N. Naguib, J. A. Libera, Chem. Phys. Lett. 2002, 365, 354), metals and magnetic nanoparticles, have received much attention in the last two decades ((a) P. M. Ajayan, S. Iijima, Nature 1993, 361, 333; b) S. Hempel, A. Leonhardt, D. Selbmann, K. Biedermann, D. Elefant, C. Muller, T. Gemming, B. Buchner, Carbon 2006, 44, 2316; c) G. Korneva, H. H. Ye, Y. Gogotsi, D. Halverson, G. Friedman, J. C. Bradley, K. G. Kornev, Nano Lett. 2005, 5, 879; d) M. Bystrzejewski, K. Pyrzynska, A. Huczko, H. Lange, Carbon 2009, 47, 1201). Encapsulating materials inside CNTs opens new application areas in environmental sciences, nanotechnology, and medical research. Encapsulating copper azide by carbon nanotubes is expected to reduce sensitivity to electrostatic charges, without compromising other energetic properties. The encapsulating material should be electrically conducting in order to dissipate electric charges and prevent detonation due to static electricity. If the CNTs are straight and open-ended, nanotube channel can potentially drive the detonation waves along its length (W. Choi, S. Hong, J. T. Abrahamson, J.-H. Han, C. Songl, N. Nair, S. Baik, M. S. Strano Nature Mater. 2010, 9, 423), increasing the efficiency of initiation of the secondary explosives and retaining the initiated particles within the nanotube. Due to the high thermal conductivity of the CNTs, thermopower waves can be guided through the nanotube channels (W. Choi, S. Hong, J. T. Abrahamson, J.-H. Han, C. Songl, N. Nair, S. Baik, M. S. Strano Nature Mater. 2010, 9, 423), and efficient heat transfer can occur from ignited nanotubes to an explosive material resulting in flash ignition even with an ordinary light source of only several W/cm$^2$ (M. R. Manaa, A. R. Mitchell, R. G. Garza, P. F. Pagoria, B. E. Watkins J. Am. Chem. Soc. 2005, 127, 13786). In addition, CNTs have excellent thermoplasticity and expansibility, which was shown by flowing high-pressure gases from explosive decomposition of picric acid through the multi-wall nanotube channels (Z. Zhu, D. Su, Y. Lu, R. Schlögl, G. Weinberg, Z. Liu Adv. Mater. 2004, 16, 443). Moreover, it has been proposed that CNTs offer the most effective protection to energetic materials since carbon has the atomic size and mass much less than that of the encapsulated metal atoms, thus the surface energy and sensitivity of the energetic materials are not compromised (I. G. Assovskiy, Propellants Explos. Pyrotech. 2008, 33, 51). The new energetic hybrid material is also expected to be easier to handle and more environmentally benign due to a less toxic metal.

Capillary action is the premise for filling nanotubes with metal nanoparticles (P. M. Ajayan, S. Iijima, Nature 1993, 361, 333; E. Dujardin, T. W. Ebbesen, H. Hiura, K. Tanigaki, Science 1994, 265, 1850; and D. Ugarte, A. Châtelain, W. A. de Heer, Science 1996, 274, 1897 (P. M. Ajayan, S. Iijima, Nature 1993, 361, 333; E. Dujardin, T. W. Ebbesen, H. Hiura, K. Tanigaki, Science 1994, 265, 1850 and D. Ugarte, A. Châtelain, W. A. de Heer, Science 1996, 274, 1897). However, capillarity is directly correlated to the surface energies of interaction between the liquid and nanotube surface. Filling is then a function of wettability (D. Mattia, M. P. Rossi, B. M. Kim, G. Korneva, H. H. Bau, Y. Gogotsi, J. Phys. Chem. B 2006, 110, 9850). According to the Young-Laplace equation, $$\Delta P \; 2\cos r^1 \qquad (1)$$

where $\Delta P$ is the pressure difference across the liquid-vapor interface, is surface tension of the liquid, is the contact angle between the liquid and solid surface, and r is radius of the tube. If the surface is hydrophobic, or non-wetting, a pressure must be applied to force the liquid into the channel (D. Ugarte, A. Châtelain, W. A. de Heer, Science 1996, 274, 1897 and T. W. Ebbesen, J. Phys. Chem. Solids 1996, 57, 951). The surface properties of the CNTs play a significant role in the ability and degree to which the nanoparticles fill the nanochannels. Hydrophobic surfaces prevent filling, as predicted by equation (2), indicating that there will be wetting only when the solid-liquid interfacial energy $(_{sl})$ is smaller than the solid-vapor interfacial energy $(_{sv})$ (D. Mattia, Y.

Gogotsi, *Microfluid. Nanofluid.* 2008, 5, 289 and T. W. Ebbesen, *J. Phys. Chem. Solids* 1996, 57, 951).

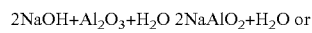  (2)

To this end, only liquids with a low surface tension, typically less than 200 mN/m, will be imbibed by small-diameter CNTs (T. W. Ebbesen, *J. Phys. Chem. Solids* 1996, 57, 951). To avoid filling complications caused by using molten metals, as previously studied (E. Dujardin, T. W. Ebbesen, H. Hiura, K. Tanigaki, *Science* 1994, 265, 1850 and D. Ugarte, A. Châtelain, W. A. de Heer, *Science* 1996, 274, 1897), a multi-step process described previously for magnetic nanoparticles has been adopted (G. Korneva, H. H. Ye, Y. Gogotsi, D. Halverson, G. Friedman, J. C. Bradley, K. G. Kornev, *Nano Lett.* 2005, 5, 879). This process involves loading the energetic fillers inside straight, aligned and open-ended nanotubes. It is important to note that copper azide can be filled inside the CNTs only when the particles are much smaller than the tube inner diameter. Additionally, the nanoparticles are expected to be more reactive and sensitive due to the high surface area to volume ratio, so they all must be contained inside the nanotubes. In this work, we demonstrate feasibility of the synthesis of copper azide inside carbon nanotubes.

As used in the specification and claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. In addition, when values are expressed as approximations, by use of the antecedent "about," it will be understood that the particular value forms another embodiment. All ranges are inclusive and combinable.

Results and Discussion

Figure 2:
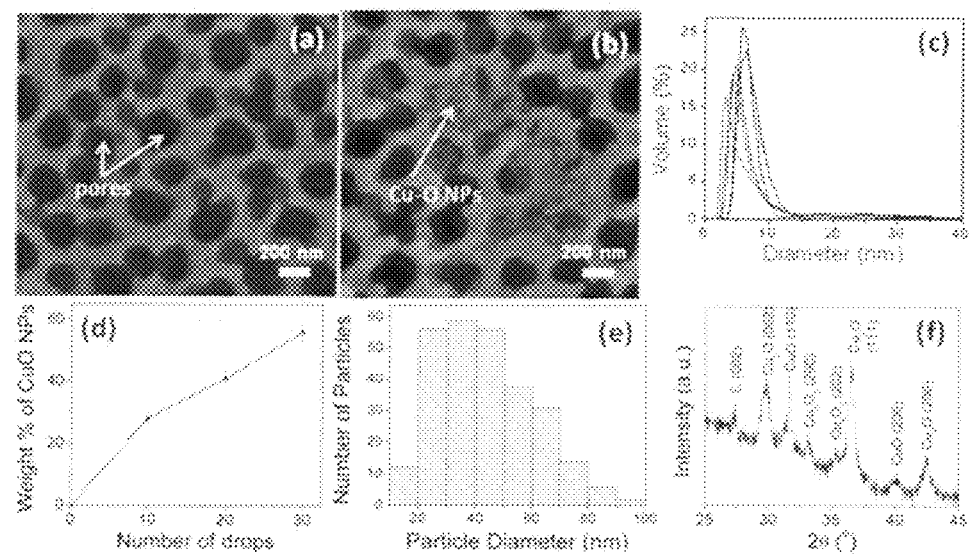
FIG. 2 presents carbon coated alumina membrane (a) before filling, and (b) after filling with Cu—O nanoparticles. (c) Particle size distribution of the colloidal solution of Cu—O NPs recorded 5 times (indicated by 5 plots). (d) Filling weight % of the Cu—O NPs into the pores of the carbon coated membrane. (e) Histogram of the Cu—O NP size distribution inside the CNTs. (f) XRD pattern of the Cu—O NPs filled CNTs.

The schematic of the synthesis procedure is presented in FIG. 1. The basic criterion to maximize the filling of nanoparticles inside the nanotubes is to have straight and long open-ended nanotubes, so that the nanoparticles can invade the nanotube channels by capillary forces. Chemical vapor deposition (CVD) of a hydrocarbon gas such as ethylene produces a continuous layer of carbon within inner walls of the ~200 nm pores of alumina membrane (FIG. 2a). Before filling the nanoparticles into the carbon coated nanopores of the alumina template, the membrane surface was oxidized in air at 450° C. for 1.5 h (S. Osswald, E. Flahaut, Y. Gogotsi, *Chem. Mater.* 2006, 18, 1525), to remove the thin carbon layer from the surface of the membranes and to ensure opening of the pores from both ends. The partial oxidation also introduced oxygen-containing hydrophilic functional groups to the inner pore walls of the carbon coated membrane, decreasing the contact angle from ~80 to less than 40 (D. Mattia, H. H. Bau, Y. Gogotsi, *Langmuir* 2006, 22, 1789), to facilitate easy entry of the colloidal nanoparticle solution into the pores and fill the pores up to the brim (FIG. 2b).

The colloidal Cu—O solution was produced following a previously reported synthesis procedure (T. Kida, T. Oka, M. Nagano, Y. Ishiwata, X.-G. Zheng, *J. Am. Ceram. Soc.* 2007, 90, 107). Since the as synthesized agglomerated nanoparticles were too large (~200 nm) to enter the 200 nm pores, the solution was centrifuged at 3000 rpm and the supernatant was filtered to yield ~5 nm Cu—O particles (FIG. 2c). The small size of the nanoparticles dispersed in ethanol and sufficient time for complete membrane infiltration ensured efficient filling of the hydrophilic carbon coated membrane pores. The time interval between the drops was found to be the key factor in maximizing filling. One to two minute intervals between drops led to accumulation of particles on the surface and produced Cu—O deposits on the surface of the membranes. On average, the filling percentages were 28, 41, and 56 weight % after adding 10, 20, and 30 drops, respectively (FIG. 2d). Filling nanotubes with aqueous or ethanolic copper salt solutions introduced significantly smaller amounts of nanoparticles inside the nanotubes (J.-P. Tessonnier, O. Ersen, G. Weinberg, C. Pham-Huu, D. S. Su, R. Schlögl, *ACS Nano* 2009, 3, 2081). In order to create densely packed copper azide within the nanotubes, attempts were made to accommodate more Cu—O nanoparticles, which led to accumulation of the nanoparticles on the surface of the membranes, detrimental from the application standpoint. An optimum filling of the pores and washing of the membrane surface was necessary so that the nanoparticles sitting at the nanotube ends were not released during dissolution of the alumina template according to the reactions:

$$2NaOH+Al_2O_3+H_2O \; 2NaAlO_2+H_2O \text{ or}$$

$$2NaOH+Al_2O_3+3H_2O \; 2NaAl(OH)_4.$$

An electron microscopic analysis of the Cu—O nanoparticles inside the CNTs showed aggregation of the filled ~5 nm colloidal particles into larger ~40 nm particles (FIG. 2e). XRD analysis of the filled CNTs showed three different Cu—O phases (FIG. 2f), isometric cuprite, $Cu_2O$ (JCPDS 05-0667), monoclinic tenorite, CuO (JCPDS 48-1548), and tetragonal paramelaconite, $Cu_4O_3$ (JCPDS 03-0879). The C (002) peak is from the graphitic structure of the CNTs (JCPDS 41-1487).

Figure 3:
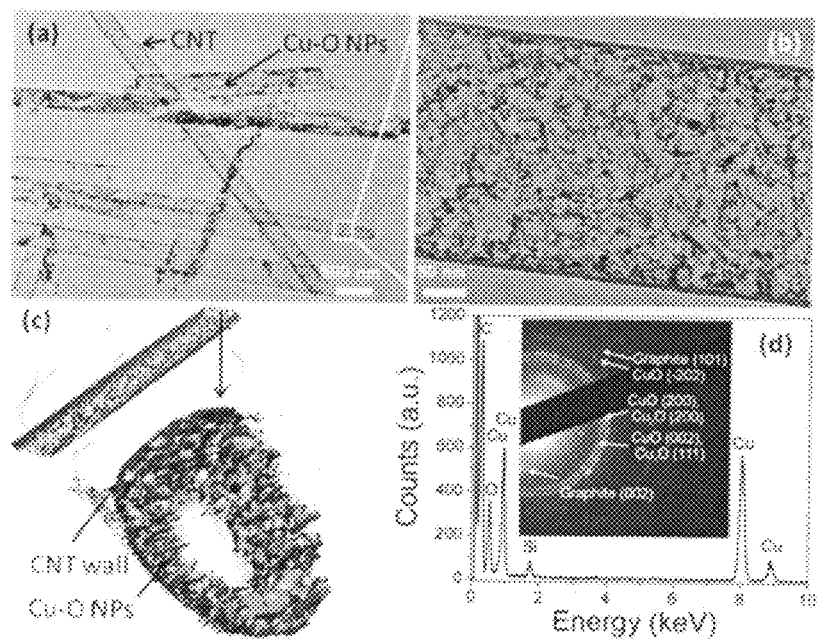
FIG. 3 presents (a) TEM micrograph of Cu—O NPs filled CNTs, (b) An enlarged view showing rod-like NPs inside the CNT framed in (a). (c) TEM 3-D reconstruction of the filled CNT shows the cross-section of the CNT with Cu—O NPs sticking to the inner walls. (d) EDS and SAED pattern (inset) showing copper oxides.
Figure 4:
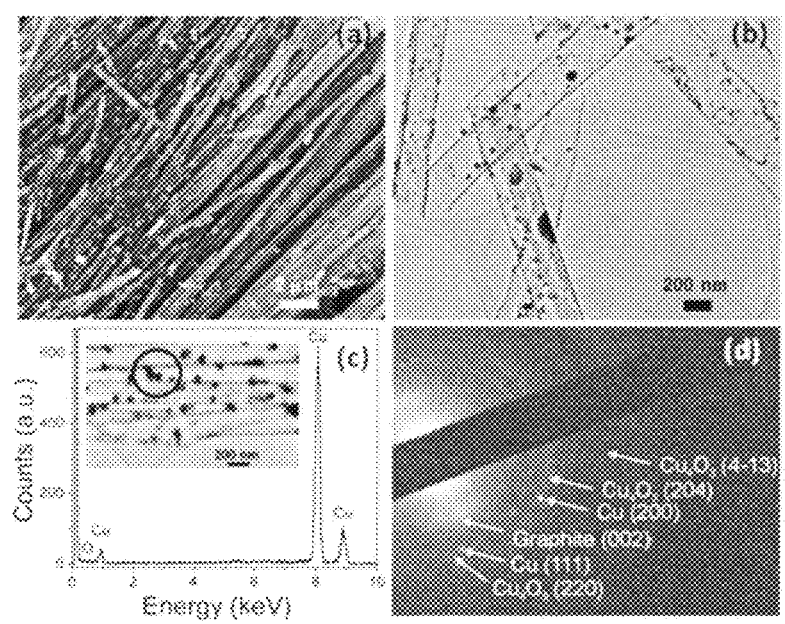
FIG. 4 presents (a) SEM and (b) TEM micrographs of Cu NP filled CNTs. (c) EDS spectrum from the area circled in inset. (d) SAED pattern of the Cu NP filled CNTs.

The CNTs were statistically filled as observed from the TEM image in FIG. 3a. The Cu—O nanoparticles were mostly rod-like (length=~36 nm; diameter=~8 nm) as can be seen in FIG. 3b. Electron tomography (3D TEM) of the filled CNTs and their cross-sections showed that Cu—O nanoparticles adhere to the inner walls of the CNTs. The tomogram of one such nanotube is depicted in FIG. 3c, showing the 3D reconstruction of a filled CNT parallel and perpendicular to the tube axis. A typical EDS and the corresponding selected area electron diffraction (SAED) pattern in FIG. 3d revealed that the nanoparticles are composed of CuO and $Cu_2O$ phases, in agreement with the XRD pattern. Hydrogen reduction of the encapsulated Cu—O nanoparticles to copper resulted in particle growth and increased spacing between Cu nanoparticles (FIGS. 4a, b). The EDS spectrum of the selected nanoparticles showed Cu peaks (FIG. 4c). However, the Cu nanoparticles were partially oxidized to paramelaconite ($Cu_4O_3$) upon re-exposure to air, which was evident from the electron diffraction pattern in FIG. 4d. Although there is partial oxidation of Cu nanoparticles upon exposure to air, the hydrogen reduction step is particularly important in order to maintain a significant inter-particle separation and subsequent confinement of the detonated azide nanoparticles within the nanotube channels. Hydrazoic acid ($HN_3$) transforms the Cu/Cu—O nanoparticles into $CuN_3/Cu(N_3)_2$ (copper (I) azide and/or copper (II) azide) within the CNTs as well as modifies the CNT surface chemistry. Partial oxidation of the Cu nanoparticles inside the CNTs however did not hinder the formation of copper azide. However, due to the presence of $Cu^0$, Cu (I) and Cu (II) oxides, a mixture of copper azides [$CuN_3$ and $Cu(N_3)_2$] was formed depending on the oxidation state of copper. The azide formation occurs according to the reactions:

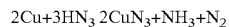

Figure 5:
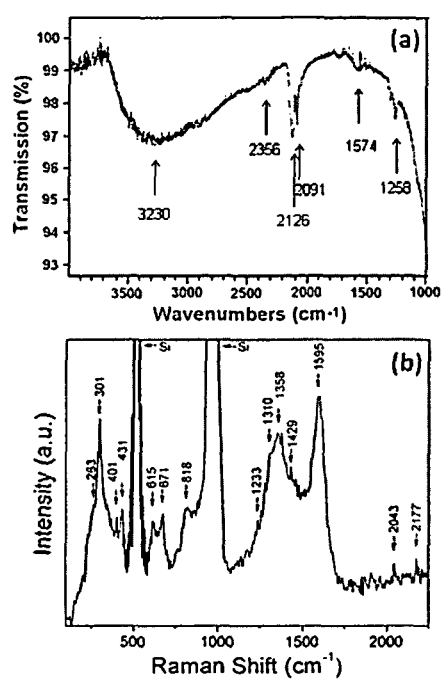
FIG. 5 presents (a) FTIR and (b) Raman spectra of the $CuN_3/Cu(N_3)_2$ inside CNTs.

The formation of the various copper azide phases is evident from the asymmetric azide peaks at 2091 and 2126 cm$^{-1}$ (C. Varotsis, M. Vamvouka, *J. Phys. Chem. B* 1999, 103, 3942), in the FTIR spectrum of the copper azide filled CNT sample (FIG. 5a). The shoulder peak at 1574 cm$^{-1}$ represents the COO$^-$ asymmetric stretching vibration and the broad band at 3230 cm$^{-1}$ is the characteristic O—H bending vibration. Since the CNTs were released in NaOH and further exposed to air at 450° C., hydroxyl, carbonyl, and carboxyl groups are expected on the surface of the CNTs. The symmetric vibrational frequencies for azides are observed at 1258 and 1300 cm$^{-1}$. The weak shoulder peak at 2356 cm$^{-1}$ is due to the physisorbed $CO_2$. Raman spectroscopy of the encapsulated copper azide samples placed on a Si wafer showed the typical Cu—N=N$^+$=N$^-$ vibrational modes (both strong and shoulder peaks in FIG. 5b) in agreement with other azide compounds (C. Varotsis, M. Vamvouka, *J. Phys. Chem. B* 1999, 103, 3942; G.-C. Guo, Q.-M. Wang, T. C. W. Mak, *J. Chem. Crystallogr.* 1999, 29, 561 and M. A. S. Goher, F. A. Mautner, *Polyhedron* 1998, 17, 1561). The observation of two asymmetric modes of $N_3$ at 2043 and 2177 cm$^{-1}$ suggests that the azide ion binds to both Cu (I) and Cu (II). The peaks at 401, and 431 cm$^{-1}$ are assigned to the Cu—$N_3$ modes, whereas the peaks at 671, 1233, 1310, and 1432 cm$^{-1}$ are assigned to ($N_3$), 2 ($N_3$), $_s$($N_3$), and the translational lattice modes, respectively. The peaks at 263 ($A_g$), 301 ($B_g$), and 615 ($B_g$) cm$^{-1}$ correspond to the unreacted Cu—O nanoparticles (H. Fan, B. Zou, Y. Liu, S. Xie, *Nanotechnology* 2006, 17, 1099). Moreover, certain intermediate bonds were formed between Cu and C during the reduction process in hydrogen, as is evident from the copper carbide peak at 818 cm$^{-1}$ (G. Wenli, Z. Yue, L. Tongxiang, *J. Mater. Sci.* 2006, 41, 5462). The typical D (1358 cm$^{-1}$) and G (1595 cm$^{-1}$) bands originated from the CNTs.

Figure 6:
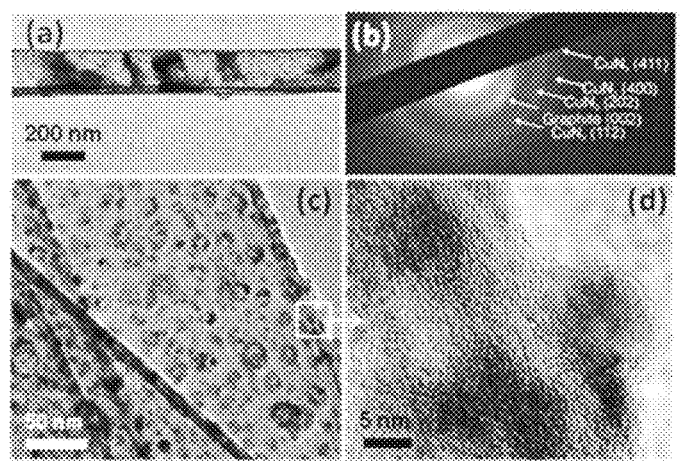
FIG. 6 presents TEM micrograph of (a) CuN3/Cu(N3)2 filled CNT, (b) SAED pattern of the CuN3 filled CNTs, (c) TEM micrograph of an initiated sample, and (d) HRTEM image of detonation products at the CNT wall.

The TEM images in FIG. 6 show copper azide nanoparticles formed inside the CNTs and exploded after initiation. The copper azide patches indicated by darker contrast (FIG. 6a), are retained within the nanotubes. FIG. 6b shows the SAED pattern, which was indexed with $CuN_3$ and graphite from the CNT. Even after initiation, the solid decomposition products were retained inside the CNTs generating 10-20 nm hollow shells (FIG. 6c). The hollow particles formed from the detonated copper azide nanoparticles is probably due to the voids created within the Cu/CuO nanoparticles, after the expulsion of nitrogen. The detonation of the copper azide nanoparticles occurs as:

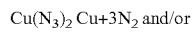

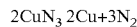

Some of the nanoparticles were embedded within the CNT walls probably as a result of the nano-explosions. However we did not observe any ripped off or destroyed CNTs after the violent initiation. While CNTs produced by templated growth usually show moderate mechanical properties (M. P. Rossi, Y. Gogotsi, K. G. Kornev, *Langmuir* 2009, 25, 2804), they are flexible and can unbuckle after deformation. In the one-dimensional narrow explosive reaction zone of CNTs, propagation of the detonation wave along the channel (W. Choi, S. Hong, J. T. Abrahamson, J.-H. Han, C. Songl, N. Nair, S. Baik, M. S. Strano *Nature Mater.* 2010, 9, 423), multi-wall CNTs may help keeping the CNT structure intact. FIG. 6d shows the HRTEM image of the typical remnants of an initiated nanoparticle captured within the CNT wall. The presence of additional phases such as copper azides and CuO cannot be excluded. In fact the formation of Cu—O (due to partial air-oxidation of Cu) is expected as a result of initiation of the energetic $CuN_3$/Cu($N_3$)$_2$ particles. The mechanism of initiation and hollow shell formation deserves further studies. We are not aware of any reports on detonated azide or other nanoparticles inside carbon nanotubes. According to our literature survey, this is the first time that highly energetic nanoparticles are stored and initiated inside nanochannel containers and observed in TEM.

The carbon nanotubes filled with metal azide are actually very small energetic devices that can be initiated at will. This technology may have applications in the medical industry, for example, forcing the detonation waves through the CNT open-ends to kill damaged tissues, targeting and ballistic delivery of nanoparticles into individual cells, opening blood clots, breaking kidney stones, etc. Although this paper deals with the confinement of copper azide inside CNTs, the technique can be equally applied to other energetic materials such as iron azide, nickel azide and silver azide. The method described in this paper for producing greener nanoenergetic materials has never been studied or attempted before. Moreover, the results obtained from this work open up a new area of studying detonation physics at the nanoscale.

We have presented a method for encapsulating copper azide inside AAO-templated carbon nanotubes. This has resulted in making an explosive device more than 100 times smaller in size than human hair. Initiation of azide inside the nanotubes did not lead to tube wall fracture. The detonation wave apparently propagated along the nanotube channel, providing an opportunity for directing the decomposition gas flow and possibly more efficient initiation of the secondary explosives. Hollow Cu/Cu—O containing nanoparticles were produced as a result of the copper azide nanoparticle initiation (in some embodiments, the copper azide within the nanotube is encapsulated). This greener approach toward energetic nanomaterials has a potential to eliminate lead from primary explosives.

EXPERIMENTAL

The gaseous hydrazoic acid was generated by heating a mixture of sodium azide with excess stearic acid above 80° C. (J. R. McDonald, J. W. Rabalais, S. P. McGlynn, *J. Chem. Phys.* 1970, 52, 1332). Caution: Hydrazoic acid is a highly toxic, very energetic and sensitive compound that can decompose explosively. It also reacts aggressively with metals such as copper, iron and nickel to form highly sensitive and explosive metal azides. It has to be handled with extreme care behind an explosion proof shield in a well-ventilated hood.

Materials: Copper acetate (Fisher Sci., 99%), acetic acid (Sigma Aldrich, >99%), sodium hydroxide (NaOH) pellets Alfa Aesar, 98%), ethanol (Electron Microscopy Sciences, 200 proof, 100%), stearic acid (Sigma Aldrich, 95%), and sodium azide (Sigma Aldrich, 99.5%) were used as received. The commercial AAO-templates (alumina membranes) with uniform distribution of ~200 nm pores were purchased from Electron Microscopy Sciences (manufactured by Whatman Scientific).

Methods: The synthesis of copper azide filled carbon nanotubes was carried out according to the following steps:
i) Synthesis of Colloidal Cu—O Nanoparticles.
0.3 g copper acetate and 0.2 mL acetic acid were dissolved in 100 mL ethanol. The solution was stirred and heated to 78° C., followed by the addition of 0.27 g NaOH. The reaction continued under the same conditions (heating with vigorous stirring) for 1 h. The colloidal solution was centrifuged at 3000 rpm for 1 h followed by filtration through polyester nucleopore membrane with pore size of 0.2 μm (Osmonic Corp.) to yield Cu—O nanoparticles.

ii) Fabrication of Carbon Coated Alumina Membranes by CVD Process.

The commercial alumina membranes were subjected to CVD in ethylene gas at 670° C. for 6 h. The carbon coated membranes (with CNTs within the membrane pores) were partially air oxidized at 450° C. for 1.5 h to remove carbon from the surface and decrease the contact angle.

iii) Filling Pores of the Carbon Coated Membranes with Cu—O Nanoparticles.

The colloidal Cu—O nanoparticle solution was added dropwise onto the carbon coated membrane in a stepwise procedure whereby 1 drop (40 L each) of the colloidal solution was added onto each side of the dried membrane in 15 min intervals. After every 10 drops, the membrane surfaces were washed with ethanol, dried, and the percentage filled was estimated gravimetrically.

iv) Release of Filled CNTs from the Alumina Template.

The filled carbon coated membranes were immersed in 30 mL of 1 M NaOH in a 100 mL round bottom flask, fitted to a condenser. The mixture was refluxed with constant stirring at 90° C. for 3 h to release the Cu—O nanoparticles filled CNTs. The dispersion was filtered through a polyester membrane and dried.

v) Reduction of Cu—O Nanoparticles Inside CNTs.

The Cu—O nanoparticles filled CNTs were placed in quartz boat under flowing Ar in a tube furnace. After 20 min, the temperature of the furnace was ramped up to 300° C., after which Ar was replaced by $H_2$ and the reduction process was carried out at 500° C. for 1.5 h. The CNTs filled with copper nanoparticles, mostly elemental copper nanoparticles, were collected after cooling down under Ar.

vi) Synthesis of $Cu(N_3)_2/CuN_3$ Inside CNTs.

A 250 mL round-bottom three-neck flask was equipped on the side necks with a nitrogen gas inlet valve and a stopper. The middle neck was equipped with an adaptor containing about one inch of a drying reagent (Drierite®). This adapter was connected to a custom-made 50 mL round bottom flask that had a male joint opening in the bottom and a regular female joint opening on top. A thin layer of glass wool was spread across the interior of the flask. The copper filled CNTs (~50 mg) were randomly deposited on the glass wool for maximum surface area exposure to $HN_3$ gas. The top of the flask was also equipped with an adapter containing about one inch of Drierite®. The adaptor was connected to a KOH solution as a scrubber for the unreacted $HN_3$ gas. After the reaction was over, the KOH scrubber solution was treated with ceric ammonium nitrate to neutralize the azide. The entire system was set up behind an explosion proof shield in a well-ventilated hood.

In a typical reaction, the 250 mL round bottom flask was charged with a magnetic stirrer, 1.0 g (15.4 mmol) of sodium azide and 5.5 g (19.3 mmol) of stearic acid. A very slow flow of nitrogen gas was introduced into the flask and it was slowly heated by an oil bath to 130-140° C. This generated a slow release of $HN_3$ gas. The joints were tested for gas leaks by holding wet litmus papers next to them. Any $HN_3$ leak would have changed the color of the wet litmus paper to the corresponding acidic color. No grease was applied to the joints to avoid the possibility of reacting with $HN_3$ and detonating while the joints were turned. After two hours at 130-140° C., the nitrogen flow was stopped and the nitrogen valve was closed to let the $HN_3$ gas slowly pass through the system and into the scrubbing solution. The gas generating flask was heated at 130-140° C. for 36-48 h. During this period the hood was closed with absolutely no other work performed in it. The $HN_3$ gas is very explosive and has been reported to undergo self-ignition (L. M. Dennis, H. Isham, *J. Am. Chem. Soc.* 1907, 29, 216). After 36-48 h, the oil bath was removed and the nitrogen valve was opened to flush the system. The product was then removed and collected from the glass wool by very gentle tapping.

Initiation:

Initiation of these energetic samples was performed by placing the glass wool containing the copper azide filled CNTs in a conductive container and applying electrostatic force using a Tesla coil.

Characterization:

The samples were characterized by scanning electron microscopy (SEM) using Zeiss Supra VP-50 field emission with the secondary-electron in-lens detector. Conventional and high-resolution transmission electron microscopy (TEM/HRTEM) was performed using a JEOL JEM-2100 operated at 200 kV with a point resolution of 0.23 nm and equipped with an EDAX EDS system. This TEM is well equipped with a high tilt sample holder allowing tilt angles up to ±60°. Serial EM software was used to record the tilt series and IMOD software was used for the reconstruction of the tomogram. The elemental analysis was also carried out using Energy Dispersive X-ray analysis (EDS, Oxford instruments, UK) coupled to the SEM. Particle size distributions of the Cu—O colloidal solutions were measured using Zetasizer Nano ZS (Malvern Instruments) in 173° scattering geometry. XRD analysis (Cu Kα, λ=1.54056 Å) was performed using a Powder Diffractometer (Siemens). A step size of 0.02° (2θ) and a collection time of 1 s per step were chosen for the analysis. The IR spectra were collected in attenuated total reflectance (ATR) mode using a Smart Omni Sampler ATR accessory fitted with a germanium crystal. Raman spectroscopy was performed using a Renishaw 1000/2000 spectrometer with 514.5 nm excitation wavelength (Ar ion laser) in back-scattering geometry.

What is claimed:

1. A method of forming nanotube structures, comprising:
   placing CuO nanoparticles within carbon nanotubes to produce packed nanotubes;
   contacting said packed nanotubes with hydrogen to produce reduced packed nanotubes; and
   contacting the reduced packed nanotubes with hydrazoic acid to produce copper azide containing carbon nanotubes.

2. The method of claim 1, wherein the hydrazoic acid was produced in gaseous form by heating a mixture of sodium azide with excess stearic acid at a temperature of at least 80° C.

3. A method of forming nanotube structures, comprising:
   forming carbon nanotube by chemical vapor deposition of ethylene on an aluminum oxide substrate;
   placing CuO nanoparticles within said carbon nanotubes to produce packed nanotubes;
   contacting said packed nanotubes with sodium hydroxide to dissolve said aluminum oxide to produce released nanotubes;
   contacting the released carbon nanotubes with hydrogen to produce reduced packed nanotubes; and
   contacting the reduced packed nanotubes with hydrazoic acid to produce copper azide containing carbon nanotubes.

* * * * *